Figure 1:
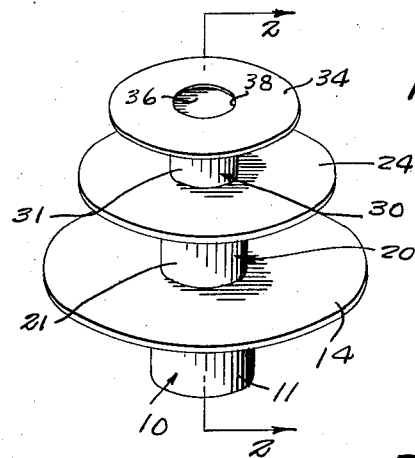

Sept. 1, 1959   A. G. AUDSLEY   2,902,174
SUPPORT FOR TIERED CAKES
Filed April 26, 1957

INVENTOR.
ALMA G. AUDSLEY,
BY
McMorrow, Berman & Davidson
ATTORNEYS.

United States Patent Office 2,902,174
Patented Sept. 1, 1959

2,902,174

SUPPORT FOR TIERED CAKES

Alma G. Audsley, De Witt, Mo.

Application April 26, 1957, Serial No. 655,270

3 Claims. (Cl. 211—141)

This invention relates generally to cake supports. Summarized briefly, the invention is a support comprising a plurality of units each adjustable in height to the thickness of an individual tier and having an outwardly directed support flange at its upper end for supporting the next tier or layer of the cake. The units are supportable one upon another, and extend within the center holes of the layers in positions concealed by the cake itself.

Among important objects of the invention are the following:

To support high-tiered cakes against falling over;
To conceal the support from view;
To assemble as many units as desired, with each unit being of any selected diameter;
To permit the swift and easy assembly of the unit in the cake, eliminating the laborious cutting of cardboard cores and support plates to exact size.

Figure 2:
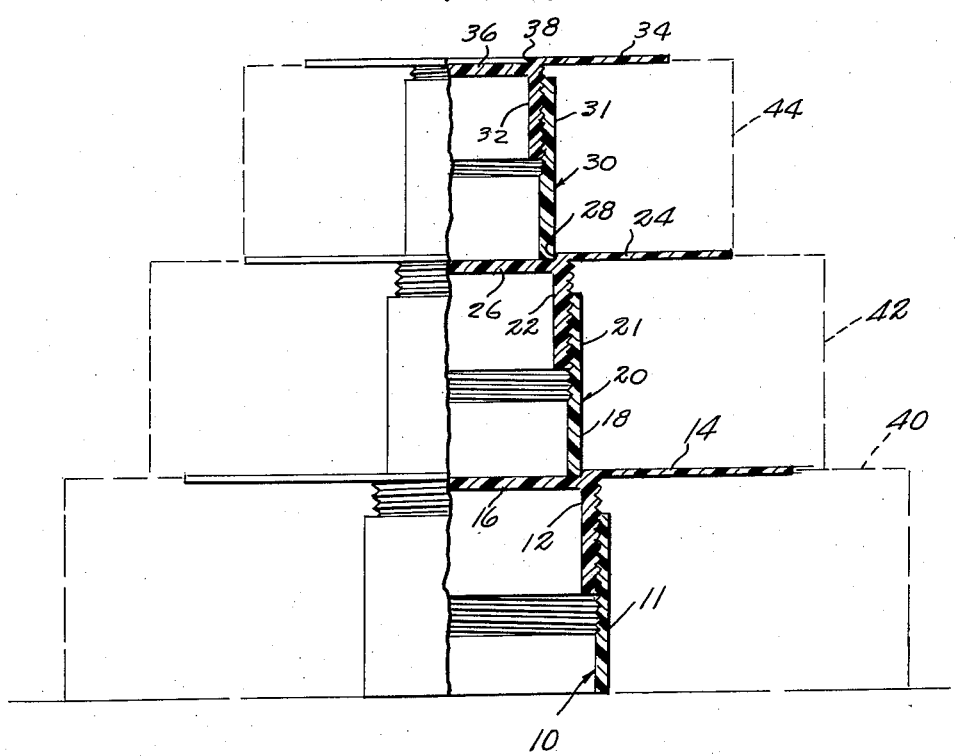

Other objects will appear from the following description, the claims appended thereto, and from the annexed drawing, in which like reference characters designate like parts throughout the several views, and wherein:

Figure 1 is a perspective view of my cake support; and
Figure 2 is an enlarged sectional view of line 2—2 of Figure 1 in which portions remain in elevation, a cake being shown in dotted lines.

Referring to the drawing in detail, a first core 10 includes a constant-diameter, open-ended, cylindrical lower core section 11 internally threaded to receive an externally threaded, constant-diameter, cylindrical upper core section 12 projecting upwardly out of the upper end of section 11. On the upper extremity of section 12 is a wholly planiform, thin, large-diameter, outwardly directed support plate 14 in a plane normal to the common axis of sections 11, 12. Section 12 is wholly closed at its upper end by a top wall 16 formed with a shallow, circular recess 18 the diameter of which is slightly less than the outer diameter of section 11.

A second core 20 includes a lower section 21 the outer diameter of which is slightly less than that of recess 18 for support of the section 21 in coaxial alignment with sections 11 and 12. A section 22 threads into section 21 and has a support plate 24 of smaller diameter than plate 14, and a top wall 26 having a shallow recess 28. A third core 30 has a lower section 31 seated in recess 28. An upper section 32 threads into section 31 and has a support plate 34 of smaller diameter than plate 24, extending outwardly from a top wall 36 shallowly recessed at 38 to receive yet another core, not shown, if desired.

Core 10 is adjustable axially to the thickness of the bottom tier 40 of a cake, such as an angel-food wedding cake. Core 10 is engageable snugly in the center hole of tier 40 with plate 14 resting firmly against the top of the tier.

A second cake tier 42, supported against sagging by plate 14, receives core 20 with plate 24 thus being disposed in position to support a top tier 44 receiving core 30. When the cake is iced, the support will be fully concealed.

The device is designed to permit use of a single core, or any number of cores. It may include or be usable with ornaments such as the bride-and-groom figures of a wedding cake. Other designs may be used in the device, as well as cake separators and the like, particularly when in association with fine-textured cakes such as angel food cakes. The measurements may vary, though generally speaking the relative proportions indicated by the drawing would always be used. Then too, though plastic is preferred as the material of which the device is made, other materials may be employed.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A support for cakes of the type having superposed tiers each of which has a center opening, said support comprising at least two upstanding cores, one for each tier, one of said cores being supported upon the other in coaxial alignment, each core comprising a vertically disposed cylindrical portion having an upper end terminating at the upper extremity of the core, said portion being extendable through the opening of its associated cake tier, each core further including a single support plate rigid with said upper end of said cylindrical portion thereof and lying in a plane normal to the length of said portion at said upper extremity of the core, said plate of each core being of a diameter substantially greater than that of said portion thereof so as to overlie a substantial part of the area of the tier through which said portion extends, in supporting relation to a tier next above said plate, said other core being formed at its upper end with a shallowly recessed top wall, on which said one core is removably supported, the recess of the top wall being of a diameter substantially matching that of the lower end of said one core, said lower end of said one core being engaged snugly in the recess against lateral displacement from a position in which the cores are in coaxial alignment.

2. A support for cakes of the type having superposed tiers each of which has a center opening, said support comprising at least two upstanding cores, one for each tier, one of said cores being supported upon the other in coaxial alignment, each core comprising a vertically disposed cylindrical portion having an upper end terminating at the upper extremity of the core, said portion being extendable through the opening of its associated cake tier, each core further including a single support plate rigid with said upper end of said cylindrical portion thereof and lying in a plane normal to the length of said portion at said upper extremity of the core, said plate of each core being of a diameter substantially greater than that of said portion thereof so as to overlie a substantial part of the area of the tier through which said portion extends, in supporting relation to a tier next above said plate, said other core being formed at its upper end with a shallowly recessed top wall, on which said one core is removably supported, the recess of the top wall being of a diameter substantially matching that of the lower end of said one core, said lower end of said one core being engaged snugly in the recess against lateral displacement from a position in which the cores are in coaxial alignment, said lower end of said one core, and the wall of the recess, being relatively formed in a manner to permit insertion of said lower end of said one core in the recess, and removal thereof from the recess by straight line movement of said one core in the direction of its length.

3. A support for cakes of the type having superposed tiers each of which has a center opening, said support comprising at least two upstanding cores, one for each tier, one of said cores being supported upon the other in coaxial alignment, each core comprising a vertically disposed cylindrical portion having an upper end terminating at the upper extremity of the core, said portion being extendable through the opening of its associated cake tier, each core further including a single support plate rigid with said upper end of said cylindrical portion thereof and lying in a plane normal to the length of said portion at said upper extremity of the core, said plate of each core being of a diameter substantially greater than that of said portion thereof so as to overlie a substantial part of the area of the tier through which said portion extends, in supporting relation to a tier next above said plate, said other core being formed at its upper end with a shallowly recessed top wall, on which said one core is removably supported, the recess of the top wall being of a diameter substantially matching that of the lower end of said one core, said lower end of said one core being engaged snugly in the recess against lateral displacement from a position in which the cores are in coaxial alignment, said lower end of said one core, and the wall of the recess, being relatively formed in a manner to permit insertion of said lower end of said one core in the recess, and removal thereof from the recess, by straight line movement of said one core in the direction of its length, each core comprising a pair of separably connected core sections, the connection of the sections to each other being comprised of mating threads on the respective sections, for relative adjustment, and separation, of the sections responsive wholly to displacement thereof in an axial direction.

References Cited in the file of this patent

UNITED STATES PATENTS

| | | |
|---|---|---|
| 599,243 | Klingler | Feb. 15, 1898 |
| 1,795,630 | Wilson | Mar. 10, 1931 |
| 2,407,747 | Sanderson | Sept. 17, 1946 |
| 2,645,375 | Topfer | July 14, 1953 |
| 2,678,143 | Dillingham | May 11, 1954 |

FOREIGN PATENTS

| | | |
|---|---|---|
| 467,701 | Germany | Nov. 2, 1928 |